Oct. 3, 1961

H. M. TURLEY 3,002,649

FLUID PASSAGE GUARD MEANS

Filed Jan. 25, 1960

INVENTOR.
HOBART M. TURLEY
BY Elliott & Pastoriza
ATTORNEYS.

Oct. 3, 1961     H. M. TURLEY     3,002,649
FLUID PASSAGE GUARD MEANS
Filed Jan. 25, 1960                    2 Sheets-Sheet 2
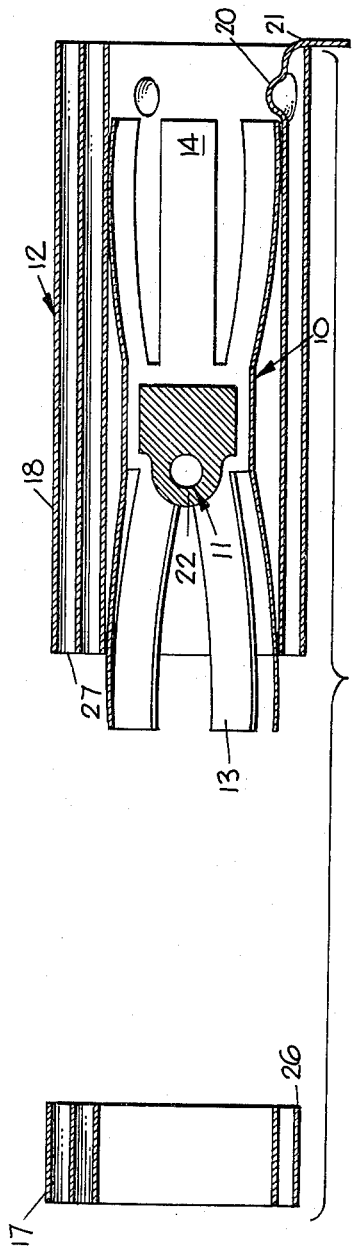
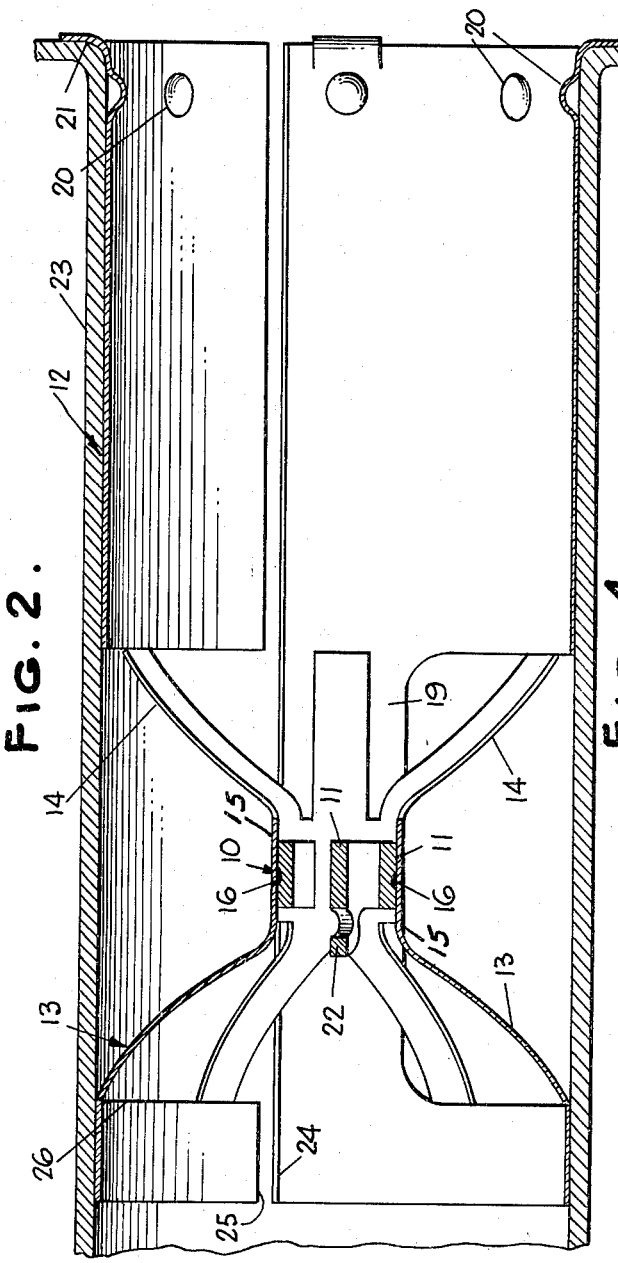
INVENTOR.
HOBART M. TURLEY
BY Elliott & Pastoriza
ATTORNEYS.

3,002,649
FLUID PASSAGE GUARD MEANS
Hobart M. Turley, 582 Vine St., Oak View, Calif.
Filed Jan. 25, 1960, Ser. No. 4,469
9 Claims. (Cl. 220—86)

This invention generally relates to fluid passage guard means, and more particularly concerns a spring biased structure for insertion in the filler neck passage communicating with a gasoline tank or equivalent receptacle, in which the spring structure functions as a guard means preventing the insertion of siphoning hoses or the like into the tank through the passage in connection with the unauthorized removal of gasoline.

It will be appreciated, however, that the guard means of the present invention may also be employed in equivalent structures wherein a fluid passage communicates with an enlarged or decreased diameter portion, whether the changed diameter portion comprises a receptacle or reservoir, or whether it merely comprises a coupling, collar, or equivalent structure. It is desirable, however, for purposes of the present invention, that the fluid passage at some point therein include a portion where the diameter is either increased or decreased, preferably increased. With the realization that the present invention may be employed in other equivalent applications, the remainder of the specification will be directed towards the specific application relative to the filler neck or passage communicating with a gasoline tank, for example, disposed in an automobile or the like.

In view of the increasing cost of gasoline, the unauthorized siphoning or pumping of gasoline from an automobile gasoline tank has become a more frequent occurrence. The problem is even more acute in view of the increased capacity of many automobile gasoline tanks. Of course, under circumstances in which gasoline is rationed or when it is scarce for other reasons, it is almost absolutely necessary to provide some effective structure for preventing theft of the gasoline fluid.

In the past, caps have been provided which embody locking mechanisms which the operator of the automobile must unlock before gasoline can either be pumped into the tank or removed therefrom. However, it has been found that such caps may be readily pried off the filler neck or otherwise forcibly removed and are not generally effective for preventing the unauthorized removal of gasoline from the tank. Also, such caps are somewhat inconvenient inasmuch as the user of the automobile must always have the key available to hand over to the gasoline attendant. Similarly, other somewhat minor but rather annoying problems result from employing a lock-type cap, particularly when the automobile may be used by several drivers in the home or business.

It is therefore an object of the present invention to provide a guard means for insertion in a tubular passage to substantially prevent the insertion of tubes or other elongated members through the passage past the point where the guard means is located.

Another object of the present invention is to provide a guard means for insertion in a tubular passage wherein the guard means may be inserted in such a manner, and in which the guard means is so constructed that upon its insertion to a given point it will thereafter remain at that point without the possibility of being moved in either direction therefrom except upon being subjected to unusual and improbable forces.

Another object of the present invention is to provide a guard means for insertion in a tubular passage which is so constructed that it may be circumferentially compressed to enable insertion into the passage, and yet which will radially expand to be locked within the passage at a given point.

Another object of the present invention is to provide a guard means for location in a fluid passage to substantially prevent the insertion of elongated members through said passage past the point of location of the guard means, and in which the guard means as such incorporates elements co-operating with the passage side walls preventing axial movement of the guard means once it has been satisfactorily inserted therein.

Still another object of the present invention is to provide a guard means for insertion in a tubular passage in which the guard means may be readily constructed from conveniently obtained material in an economical manner, and in which the guard means may be inserted in the passage without opening the passage or the receptacle to which it may be connected.

Still a further object of the present invention is to provide a guard means for insertion in a tubular passage which is comprised of a minimum number of parts, and which will not require maintenance during the life of the vehicle or the passage in which it is incorporated.

These and other objects and advantages of the present invention are generally attained by providing in a tubular passage having a changed diameter portion at a given point therein, guard means according to the present invention substantially preventing the insertion of elongated members through the passage past the given point. The guard means, more particularly, comprises a first spring means disposed within the passage and circumferentially constrained thereby, the first spring means having at least one radially outwardly projecting member designed to be aligned with the changed diameter portion so as to limit axial movement of the first spring means in the passage in at least one direction.

In co-operation with the first spring means, a second spring means is axially coupled therein within the length of the first spring means, and the second spring means includes a plurality of radially extending arms adapted to engage and be radially constrained by the passage sidewalls.

In a preferred embodiment, the second spring means is so designed that it may be compressed and urged radially inward for axial movement relative to the first spring means. Also, in the preferred embodiment, the second spring means is so constructed that it may also be circumferentially decreased in diameter to enable its insertion through a restricted opening to the tubular passage or the like.

A better understanding of the present invention will be had by reference to the drawings showing merely one illustrative embodiment, and in which:

FIGURE 2 is a sectional view taken in the direction of the arrows 2—2 of FIGURE 1;

Figure 1:
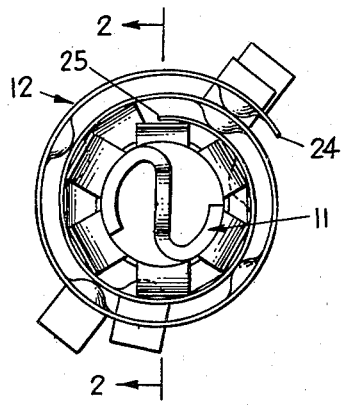
FIGURE 1 is an end view of the fluid passage guard means according to the present invention, showing the elements thereof in a circumferentially compressed position.

Referring now to the drawings, there is shown therein a spring means in the form of a spring cage 10 mounted on a yoke means 11 for sliding telescoping movement within a coiled spring sheet of material or member 12, as mostly clearly illustrated in the views of FIGURES 1 and 2.

The spring cage or spring means 10 comprises a plurality of radially flared arms 13 at one end and a plurality of radially flared out arms 14 at the other end integrally coupled together through a central cylindrical sleeve 15. The spring cage 10 is, of course, constructed from spring material of a design such that the arms 13 and 14 are biased in a radially outward direction whereby, if unconstrained, they would tend, respectively, to assume planes perpendicular to the axis of the central sleeve 15.

The yoke means 11 may comprise any suitable type of core or mandrel type structure of rigid construction to which the central sleeve may be securely attached, for example, as by welding 16, as most clearly shown in view of FIGURE 4. The S shaped structure shown in the drawings is merely illustrative of various yoke structures that might be used. For example, a horseshoe shaped unit could also equally well be employed.

The spring cage or spring means 10 in a compressed position, that is, with the arms 13 and 14 thereof urged radially inwardly, is shown in FIGURES 1 and 2 disposed within the other spring means or coil spring member 12. The coiled spring member 12 includes a short collar portion 17 and an elongated cylindrical retainer portion 18 within which the spring cage 10 is radially disposed in the views of FIGURES 1 and 2.

As most clearly shown in the view of FIGURE 1, the spring means or coiled spring sheet 10 in its circumferentially compressed form merely comprises a manually coiled sheet of spring material which is retained in this position prior to insertion in the fluid passage or filler neck connected to the gasoline tank, all as will become clear as the specification proceeds.

The cylindrical retainer portion 18 is coupled to the collar 17 and integrally formed therewith, as by ribs 19, one of the ribs 19 being shown in the view of FIGURE 4. The other of the ribs is similarly constructed, although not shown in the drawings, and would be disposed in diametrical opposition to the rib 19. The ribs define together with the collar 17 and retainer 18 a circumferentially extending window or slot as shown in FIGURE 4.

The cylindrical retainer portion 18 of the spring means 12 further embodies a plurality of radially inwardly projecting members or dimples 20, as most clearly shown in the view of FIGURES 2 and 4, which are designed, as shown in the view of FIGURE 2, to limit axial sliding movement of the spring cage 10 in one direction.

The cylindrical retainer portion 18 also embodies at one end thereof a plurality of radially outwardly projecting members or lugs 21 designed to be aligned with and co-operate with the changed or increased diameter portion of the fluid passage in a manner that will become clearer as the specification proceeds.

The yoke means 11 includes a looped portion 22, as clearly shown in the views of FIGURES 2 and 4, designed to receive the hooked end of a conventional tool or force exerting member for movement of the overall combination of the guard means through the fluid passage.

The operation of the fluid passage guard means, according to the present invention, may now be described.

Initially, the spring cage means 10 is manually or otherwise circumferentially compressed by forcing the arms 13 and 14 radially inwardly; the spring cage means 10 is then forced through the collar 17 and telescoped down through the cylindrical retainer portion 18 of the spring means 12 to the position indicated in FIGURES 1 and 2.

Thereafter, the entire guard unit assembly in its circumferentially compressed position is urged through the restricted opening, for example, in the filler neck of the tubular member connecting with a gasoline tank. Towards this end, it is desirable (as heretofore mentioned) to use some kind of elongated hook member designed to co-operate with the looped portion 22 of the yoke member 11.

Figure 3:
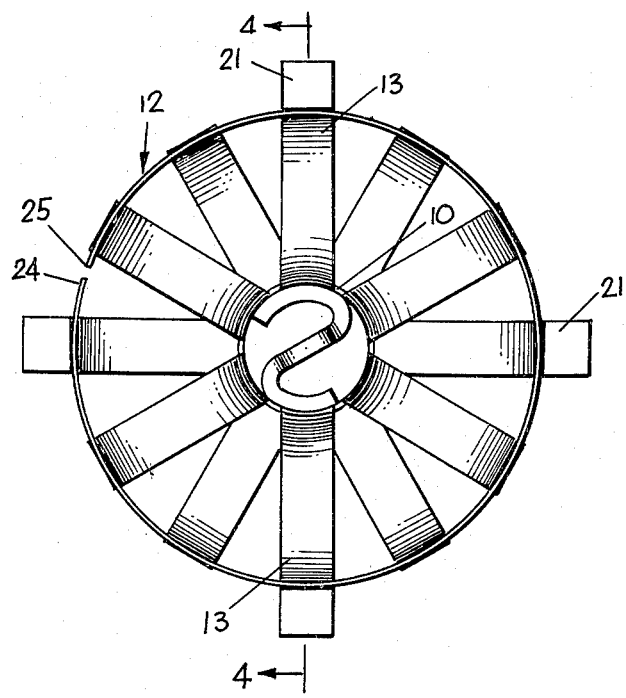
FIGURE 3 is an end view, similar to FIGURE 1 in which the elements of the guard means are shown in a radially expanded position; and, FIGURE 4 is a sectional view taken in the direction of the arrows 4—4 of FIGURE 3, again illustrating the elements of the guard means in a radially expanded position, except that FIGURE 4 shows the guard means in its final expanded set position in a tubular member.

Once the guard unit has been forced through the restricted opening of the filler neck passage, the coiled spring member 12, as a whole, will circumferentially expand in accordance with the biasing force thereof until it assumes the position of FIGURES 3 and 4 in which the lugs 21 are radially constrained against the side walls of the filler neck passage, for example, 23 as indicated in the view of FIGURE 4. Thus, the longitudinally extending edge portions 24 and 25 of FIGURE 1 will move to the positions indicated in FIGURE 3.

Thereafter, the particular hooked tool member may be used to force the guard unit down through the filler neck until such time as the lugs 21 pass beyond the bottom of the filler neck to the point where the filler neck merges into the enlarged diameter portion defined by the gasoline tank. At that time, the coiled spring member 12 will expand further radially outwardly whereby the lugs 21 will extend beyond the diameter of the fluid passage.

At this time, the hooked tool may be used to draw the guard unit back up through the passage until the lugs 21 engage the side walls, as shown in FIGURE 4, of the increased diameter portion. It will be appreciated, however, that it is not necessary for the diameter to be increased; it also may be decreased, in which event the lugs 21 would merely be sprung over the decreased diameter portion to be retained by the innermost sidewalls thereof.

The guard unit will then be in the position indicated in FIGURE 4 except that the spring cage or spring means 10 will still be disposed within the cylindrical retainer portion 18 of the other spring means or now split cylindrical sheet member 12.

In consequence, the hook member is still employed to further exert a pulling force on the spring cage 10 whereby it will move outwardly until the arms 13 thereof engage the circumferential edge portion 26 of the collar 17. A further outward force may then be exerted upon the yoke means 11 through its looped portion 22 so as to bow the arms 13 outwardly to enable the arms 14 to snap into the position as indicated in FIGURE 4, whereby they will abut against the circumferential edge portion 27 of the cylindrical retainer portion 18 of the spring means 12.

When this final position is assumed, it will be clearly evident that the guard means cannot be moved upwardly or downwardly within the passage. Of course upward movement is effectively prevented by the lugs 21 engaging the sidewalls of the changed diameter or increased diameter portion. Downward movement of the guard unit is prevented by the tendency of the arms 14 to have their terminal end portions frictionally engage and bite into the side walls of the fluid passage upon application of any inwardly directed axial force thereon. In addition, the inwardly directed force will also tend to bow outwardly the arms 13. It should be noted that the arms 13 are also biting into the sidewalls of the fluid passage such that they co-operate with the lugs 21 in preventing any movement outwardly of the guard assembly.

Thus, the arms 13 and 14 will prevent insertion of siphoning tubes into the tank without preventing free flow of fluid.

It will be appreciated that certain modifications and changes may be made in the structure shown for illustrative purposes without departing from the spirit and scope of the invention.

It is believed, however, that the fluid passage guard means of the present invention enables an economical construction for a unit which may be inserted in fluid passages, for example filler necks leading to gasoline tanks of automobiles, without modification thereof and without the necessity of dismantling the gasoline tank or passage connected thereto. Furthermore, an extremely economical, and fool-proof construction is accomplished without the requirement of any maintenance throughout the life of the vehicle or fluid passage in which the guard means of the present invention is incorporated.

What is claimed is:

1. In a tubular passage having a changed diameter portion at a given point therein, guard means substantially preventing the insertion of elongated members through said passage past said given point, said guard means comprising; first generally cylindrical coil spring means disposed within said passage and circumferentially constrained thereby, said first spring means having at least one radially outwardly projecting member designed to be aligned with said changed diameter portion to stop axial movement of said first spring means in said passage in at least one direction; second spring means axially coupled within the length of said first spring means, said second spring means including a plurality of radially extending arms engaging and radially constrained by said passage.

2. The subject matter, according to claim 1, in which said second spring means may be urged radially inward for axial movement relative to said first spring means, and in which said first spring means includes stop means limiting said axial movement to a given position relative to said first spring means in a direction opposite to said one direction.

3. The subject matter, according to claim 2, in which said stop means comprises at least one radially inwardly projecting member, and in which said second spring means telescopes within said first spring means to engage said inwardly projecting member.

4. The subject matter, according to claim 1, and yoke means, said second spring means being coupled to said yoke means.

5. The subject matter, according to claim 4, in which said yoke means includes a looped portion.

6. In a tubular passage having an increased diameter portion at a given point therein, guard means substantially preventing the insertion of elongated members through said passage past said given point, said guard means comprising: a first split cylindrical spring sheet member disposed within said passage and circumferentially constrained thereby, said first spring member having at one end thereof at least one radially outwardly projecting member designed to be aligned with said increased diameter portion to stop axial movement of said first spring member in said passage in at least one direction, and said first spring member defining a circumferentially extending window in its intermediate portion; second spring means disposed within the length of said first spring member, said second spring means including a first plurality of radially outwardly extending arms aligned with said window to co-operatively engage one edge portion of said window and to be radially constrained by said passage, and said second spring means including a second plurality of radially outwardly extending arms aligned with said window to co-operatively engage another edge portion thereof and to be radially constrained by said passage.

7. The subject matter according to claim 6, in which said second spring means is constructed such that its arms may be urged radially inward for axial movement of said second spring means relative to said first spring means, and in which said first spring means includes stop means limiting said axial movement to a given position relative to said first spring means in a direction opposite to said one direction.

8. The subject matter according to claim 6, in which said first spring means is constructed such that it may be compressed circumferentially by coiling into a smaller diameter, whereby said first spring means may be inserted through a restricted opening in a fluid passage and thereafter enabled to expand to engage the side walls of said passage.

9. The subject matter according to claim 6, and yoke means, said second spring means being coupled to said yoke means, said yoke means being provided with a looped portion for coupling to a force exerting tool.

References Cited in the file of this patent
UNITED STATES PATENTS
2,281,448    Mathey _____ Apr. 28, 1942